US009194753B2

(12) United States Patent
Paulus et al.

(10) Patent No.: US 9,194,753 B2
(45) Date of Patent: Nov. 24, 2015

(54) METHOD AND DEVICE FOR THE FAST PHASE EVALUATION, IN PARTICULAR OF MULTI-CYCLE PULSES OF LASER RADIATION

(75) Inventors: Gerhard Georg Paulus, Jena (DE); Arthur Maxwell Sayler, Jena (DE); Tim Rathje, Jena (DE); Max Möller, Grosspürschütz (DE); Dominik Hoff, Sundern (DE)

(73) Assignee: FEMTOLASERS PRODUKTIONS GMBH (AT)

( * ) Notice: Subject to any disclaimer, the term of this patent is extended or adjusted under 35 U.S.C. 154(b) by 0 days.

(21) Appl. No.: 14/009,341

(22) PCT Filed: Mar. 30, 2012

(86) PCT No.: PCT/DE2012/000387
§ 371 (c)(1),
(2), (4) Date: Oct. 2, 2013

(87) PCT Pub. No.: WO2012/136197
PCT Pub. Date: Oct. 11, 2012

(65) Prior Publication Data
US 2014/0023099 A1    Jan. 23, 2014

(30) Foreign Application Priority Data
Apr. 6, 2011    (DE) .......................... 10 2011 016 441

(51) Int. Cl.
*G01J 4/00*    (2006.01)
*G01J 11/00*    (2006.01)
(52) U.S. Cl.
CPC ...................................... *G01J 11/00* (2013.01)

(58) Field of Classification Search
CPC ..................................... G01J 4/00; G01J 11/00
USPC .......................................................... 356/364
See application file for complete search history.

(56) References Cited

U.S. PATENT DOCUMENTS

| 4,575,247 | A | 3/1986 | Tansey ........................... 356/349 |
| 5,493,433 | A * | 2/1996 | Prucnal et al. .................. 398/98 |
| 5,604,591 | A | 2/1997 | Kitagawa ....................... 356/351 |
| 6,801,318 | B2 * | 10/2004 | Fu et al. ......................... 356/450 |

(Continued)

FOREIGN PATENT DOCUMENTS

| CN | 1554931 A | 12/2004 |
| CN | 101858789 A | 10/2010 |
| DE | 10 2011 019 814.5 | 11/2011 |

OTHER PUBLICATIONS

P.B. Corkum et al., "Subfemtosecond pulses" Optic Letters, vol. 19, No. 22 (1994) pp. 1870-1872, ISSN 0146-9592.

(Continued)

*Primary Examiner* — Roy M Punnoose
(74) *Attorney, Agent, or Firm* — Ostrolenk Faber LLP

(57) ABSTRACT

The aim of the present disclosure is to enable a fast CE phase evaluation of the laser pulses, in particular in real time, including for multi-cycle pulses. Said aim is achieved by providing a polarization gating stage (8) for changing the laser pulses (7) to be evaluated in the phase and subsequent phase evaluation stage (15) for measuring the phase position of the changed laser pulses. The descriptions in the present disclosure can be used for example in laser technology for producing and monitoring single-cycle pulses.

5 Claims, 2 Drawing Sheets

(56) References Cited

U.S. PATENT DOCUMENTS

| | | | |
|---|---|---|---|
| 7,239,396 B2 | 7/2007 | Krause et al. | 356/477 |
| 7,839,905 B2 | 11/2010 | Kaertner et al. | 372/25 |

OTHER PUBLICATIONS

T.M. Fortier et al. "Carrier-Envelope Phase-Controlled Quantum Interference of Injected Photocurrents in Semiconductors", Physical Review Letters, vol. 92, No. 14 (2004) pp. 147403-1 to 147403-4, ISSN 0031-9007.

Steve Gilbertson et al. "Isolated attosecond pulse generation using multicycle pulses directly from a laser amplifier", Physical Review A 81 (2010) pp. 043810-1 to 043810-9, ISSN 1050-2947.

C.A. Haworth et al. "Half-cycle cutoffs in harmonic spectra and robust carrier-envelope phase retrieval", Nature Physics, vol. 3 (2007) pp. 52-57.

Markus Kreß et al. "Determination of the carrier-envelope phase of few-cycle laser pulses with terahertz-emission spectroscopy", Nature Physics, vol. 2 (2006) pp. 327-331.

M. Nisoli et al. "A novel-high energy pulse compression system: generation of multigigawatt sub-5-fs pulses", Applied Physics B Lasers and Optics B65 (1997) pp. 189-196.

G.G. Paulus et al. "Absolute-phase phenomena in photoionization with few-cycle laser pulses", Nature, vol. 414 (2001) pp. 182-184.

G.G. Paulus et al. "Measurement of the Phase of Few-Cycle Laser Pulses", Physical Review Letters, vol. 91, No. 25 (2003) pp. 253004-1 to 253004-4, ISSN 0031-9007.

G. Sansone et al. "Isolated Single-Cycle Attosecond Pulses", Science, vol. 314, (2006) pp. 443-446, ISSN 0036-8075.

A.M. Sayler et al. "Real-time pulse length measurement of few-cycle laser pulses using above-threshold ionization", Optics Express, vol. 19, No. 5 (2011) pp. 4464-4471.

A.M. Sayler et al. "Precise, real-time, every-single-shot, carrier-envelope phase measurement of ultrashort laser pulses", Optics Letters, vol. 36, No. 1 (2011) pp. 1-3, ISSN 0146-9592.

O. Tcherbakoff et al. "Time-gated high-order harmonic generation", Physical Review (2003) pp. 043804-1 to 043804-4, ISSN 1050-2947.

P. Tzallas et al. "Generation of intense continuum extreme-ultraviolet radiation by many-cycle laser fields", Nature Physics (2007) pp. 846-850.

P. Tzallas et al. "Measuring the absolute carrier-envelope phase of many-cycle laser fields", Physical Review (2010) pp. 061401-1 to 061401-4, ISSN 1050-2947.

T. Wittmann et al. "Single-shot carrier-envelope phase measurement of few-cycle laser pulses", Nature Physics, vol. 5 (2009) pp. 357-362.

A. Apolonski et al. "Observation of Light-Phase-Sensitive Photoemission from a Metal", Physical Review Letters, vol. 92, No. 7 (2004) pp. 073902-1 to 073902-4, ISSN 0031-9007.

International Preliminary Report on Patentability (Chapter I of the Patent Cooperation Treaty) and Written Opinion of the International Searching Authority dated Oct. 8, 2013 in corresponding International Application No. PCT/DE2012/000387 (English language).

International Search Report and Written Opinion dated Sep. 14, 2012 issued in corresponding International Patent Application No. PCT/DE2012/000387.

Chinese Office Action mailed Jun. 1, 2015 in corresponding Chinese Patent Application No. 201280020289.2, along with English translation of relevant portions thereof.

M. Nisoli et al., "New frontiers in attosecond science," Progress in Quantum Electronics, vol. 33, pp. 17-59, 2009.

\* cited by examiner

METHOD AND DEVICE FOR THE FAST PHASE EVALUATION, IN PARTICULAR OF MULTI-CYCLE PULSES OF LASER RADIATION

CROSS REFERENCE TO RELATED APPLICATIONS

The present application is a 35 U.S.C. §371 National Phase conversion of PCT/DE2012/000387, filed Mar. 30, 2012, which claims benefit of German Application No. 10 2011 016 441.3, filed Apr. 6, 2011, the disclosure of which is incorporated herein by reference. The PCT International Application was published in the German language.

TECHNICAL FIELD OF THE INVENTION

The invention relates to a method and device for the fast phase evaluation, in particular of multi-cycle pulses of a laser radiation.

BACKGROUND OF THE INVENTION

The absolute phase is defined as the shift between the maximum of the pulse envelope and the nearest maximum of the carrier wave of the electric field of a laser pulse. The absolute phase is frequently also referred to as carrier-envelope phase (CEP). This is, thus, a quantity that is required to describe the exact course of the electric field of laser pulses of any kind. CEP plays a central role, particularly in laser pulses whose pulse envelopes have a FWHM (full widths at half maximum) of only a few optical cycles, so-called few-cycle pulses or single-cycle pulses, since the electric field of these pulses has particularly large CEP-dependent asymmetries. CEP-dependencies are, however, also observed in experiments with multi-cycle pulses.

The generation of single-cycle pulses has been possible since 1997 (M. Nisoli, S. Stagira, S. De Silvestri, O. Svelto, S. Sartania, Z. Cheng, M. Lenzner, C. Spielmann, F. Krausz: A novel high energy pulse compression system: Generation of multigigawatt sub-5-fs pulses, Applied Physics B-Lasers And Optics, 1997, Vol. 65; 189-196). Since then, these laser pulses and their interactions with matter constitute a field of research of central interest and are extensively studied.

In 2001, effects of the absolute phase were directly detected in the photoionization of noble gases (G. G. Paulus, F. Grasbon, H. Walther, P. Villoresi, M. Nisoli, S. Stagira, E. Priori, S. De Silvestri: Absolute-phase phenomena in photo-ionization with few-cycle laser pulses, NATURE, 2001, Vol. 414, 182-184). In doing so, the CEP-dependent asymmetries of single-cycle pulses were observed in the form of spatially asymmetrically emitted photoelectrons. To this end, two oppositely arranged time-of-flight spectrometers (stereo time-of-flight spectrometers) were used.

Since then, other devices for CEP measurements have also been proposed and partially implemented. In those cases, it was usually necessary to average over effects induced by hundreds or thousands of laser pulses in order to determine the CEP of the laser pulses. Similarly, the majority of those methods would usually only work if the laser pulses are shorter than approximately two optical cycles (half width) (about 6 fs at 800 nm central wavelength of the laser). (T. M. Fortier, P. A. Roos, D. J. Jones, S. T. Cundiff, R. D. R. Bhat, J. E. Sipe: Carrier-Envelope Phase-Controlled Quantum Interference of Injected Photocurrents in Semiconductors, Phys. Rev. Letters, 2004, Vol. 92, No. 14; A. Apolonski, P. Dombi, G. G. Paulus, M. Kakehata, R. Holzwarth, Th. Udem, Ch. Lemell, K. Torizuka, J. Burgdörfer, T. W. Hänsch, F. Krausz: Observation of Light-Phase-Sensitive Photoemission from a Metal. Phys. Rev. Letters, 2004, Vol. 92, No. 7; M. Kreβ, T. Löffler, M. D. Thomson, R. Dörner, H. Gimpel, K. Zrost, T. Ergler, R. Moshammer, U. Morgner, J. Ullrich, H. G. Roskos: Determination of the carrier-envelope phase of few-cycle laser pulses with terahertz-emission spectroscopy, Nature Physics Let., 2006, Vol. 2, 327-331; C. A. Haworth, L. E. Chipperfield, J. S. Robinson, P. L. Knight, J. P. Marangos, J. W. G. Tisch: Half-cycle cutoffs in harmonic spectra and robust carrier-envelope phase retrieval, Nature Physics, 2007, Vol. 3, 52-57; G. G. Paulus, F. Lindner, H. Walther, A. Baltuska, E. Goulielmakis, M. Lezius, F. Krausz: Measurement of the phase of few-cycle laser pulses, Phys. Rev. Let., 2003, Vol. 91, Issue 25).

In 2009, it was for the first time possible to determine the CEP of single-cycle pulses with high accuracy using the above-mentioned stereo time-of-flight spectrometer arrangement in the single-shot mode (T. Wittmann, B. Horvath, W. Helml, M. G. Schatzel, X. Gu, A. L. Cavalieri, G. G. Paulus, R. Kienberger: Single-shot carrier-envelope phase measurement of few-cycle laser pulses, Nature Physics, 2009, Vol. 5; 357-362). This set-up, too, is only suitable for measuring the CEP of single-cycle pulses having a half-peak duration of less than 8 fs.

In 2010, a further method was demonstrated, which enabled the measurement of the CEP of ultrashort pulses having pulse durations of 38 fs in the single-shot mode (P. Tzallas, E. Skantzakis, and D. Charalambidis: Measuring the absolute carrier-envelope phase of many-cycle laser fields, PHYSICAL REVIEW A 82, 061401(R), 2010). There, a laser pulse with time-dependent polarization is used in interaction with a noble gas for the generation of radiation in the extreme ultraviolet range, so called high harmonics. The CEP of the ultrashort pulse can be determined from the exact measurement of the course of the spectral intensity of the extreme ultraviolet radiation. That method can, however, only be implemented at very high pulse energies (higher than 50 mJ), requiring comparatively expensive equipment. That method, moreover, involves high expenditures in the data transfer and calculation of the CEP such that the pulse repetition rate is limited. That method, thus, enables neither the determination of the CEP nor any influence on the CEP or a correlation of the CEP measurement with the measurement of other physical quantities in real time. In particular the need for very high pulse energies allows the use of that method as a basis for CEP control or a correlation of the CEP measurement with the measurement of other physical quantities in real time (CEP tagging) only for laser systems that provide low pulse repetition rates and pulse energies of several 10 mJ.

A device for the fast phase evaluation of single-cycle pulses was also already proposed (DE 10 2010 019 814.5), by which the determination of the CEP could be markedly improved based on the principle of the stereo time-of-flight spectrometer. That device allows for the single-shot determination of the CEP of single-cycle pulses in real time at repetition rates in the KHz range. At the same time, the equipment required for the CEP measurement is considerably reduced, and a high accuracy of the CEP measurement in the range below 200 mrad is achieved, while needing comparatively moderate pulse energies in the order of some 10 µJ. That device can thus serve as a basis for CEP control or a correlation of the CEP measurement (CEP tagging) with the measurement of other physical quantities in real time (A. M. Sayler, Tim Rathje, Walter Müller, Klaus Rühle, R. Kienberger, G. G. Paulus: Precise, real-time, every-single-shot, carrier-envelope phase measurement of ultrashort laser pulses, OPTICS LETTERS, Vol. 36, No. 1, 2011), although it is disadvantageous for the determination of the CEP that the output radius parameter R is reduced at the transition from single-cycle pulses to multi-cycle pulses, while the scatter Δr remains largely constant (A. M. Sayler, Tim Rathje, W. Müller, Ch. Kürbis, Klaus Rale, Gero Stibenz, and G. G. Paulus: Real-time pulse length measurement of few-cycle laser pulses using above-threshold ionization, Optics Express Vol. 19, Iss. 5, 2011, 4464-4471). Since the uncertainty of the CEP measurement ΔΦ approximately behaves like Δr/R (ΔΦ~Δr/R), this leads to two essential problems for the CEP determination in real time and the single-shot mode:

1) The uncertainty of the CEP determination increases with the pulse duration, since the radius parameter R decreases at an increasing pulse duration, and ΔΦ~Δr/R applies.
2) The CEP measurement will no longer be feasible, if Δr reaches the order of dimension of R, because the uncertainty of the CEP determination will become too large. The limit is typically at 8 fs (at a central wavelength of 800 nm).

It is also known that laser pulses with time-dependently changing polarization directions are applied in the examination and optimization of the interaction of laser pulses with matter. The generation of laser pulses with time-dependently changing polarization directions takes place in a so-called polarization gating stage, which can be realized in various ways. (O. Tcherbakoff, E. Mével, D. Descamps, J. Plumridge, and E. Constant: Time-gated high-order harmonic generation, PHYSICAL REVIEW A 68, 2003, 043804; G. Sansone, E. Benedetti, F. Calegari, C. Vozzi, L. Avaldi, R. Flammini, L. Poletto, P. Villoresi, C. Altucci, R. Velotta, S. Stagira, S. De Silvestri, M. Nisoli: Isolated Single-Cycle Attosecond Pulses, Science 314, 2006, 443; P. Tzallas, E. Skantzakis, C. Kalpouzous, E. P. Benis, G. D. Tsakiris, D. Charalambidis: Generation of intense continuum extreme-ultraviolet radiation by many-cycle laser fields, Nature Physics, Vol. 3, 2007; P. B. Corkum, N. H. Burnett, M. Y. Ivanov: Subfemtosecond pulses, Optics Letters, Vol. 19, No. 22, 1994).

A special possibility is the use of different birefringent quartz plates of different thicknesses in combination with one or several Brewster windows (S. Gilbertson, Y. Wu, S. D. Khan, M. Chini, K. Zhao, X. Feng, and Z. Chang: Isolated attosecond pulse generation using multicycle pulses directly from a laser amplifier, PHYSICAL REVIEW A 81, 2010, 043810). So far, these techniques have been used to generate attosecond laser pulses. The use of these techniques for fast CE-phase evaluation is not known.

SUMMARY OF THE INVENTION

The invention is based on the object to enable the fast CE-phase evaluation of laser pulses, in particular in real time, also for multi-cycle pulses.

This object is achieved by a method for the fast phase evaluation, in particular of multi-cycle pulses of a laser radiation, in that laser pulses each comprising at least one region of approximately linear polarization and at least one region of non-linear polarization are generated, wherein the respective phase of the at least one region of approximately linear polarization is measured.

In a particular case, in order to generate differently polarized pulse regions, at least a second, time-delayed pulse partially overlapping the original pulse is generated of each linearly polarized laser pulse for the purpose of the phase evaluation of the latter, wherein, of the laser pulse combinations each made up of a first and the respectively associated, at least second, time-delayed pulse, the overlapping pulse area each comprises an approximately linear polarization, whose phase is measured.

A device for the fast phase evaluation, in particular of multi-cycle pulses of a laser radiation, comprises a polarization gating stage for changing the laser pulses to be evaluated in the phase, and a phase evaluation stage connected to the polarization gating stage for measuring the phase position of the changed laser pulses.

The polarization gating stage and the phase evaluation stage can be realized by different optical and/or electronic or computational arrangements.

The currently known options allow for the determination of the CE phase in the single-shot mode in real time only for single-cycle pulses. By contrast, the invention allows for the determination of the CE phase in real time and in the single-shot mode with high precision also of multi-cycle pulses.

BRIEF DESCRIPTION OF THE DRAWINGS

In the following, the invention will be explained in more detail by way of exemplary embodiments illustrated in the drawing. Therein.

DESCRIPTION OF PREFERRED EMBODIMENTS

Figure 1:
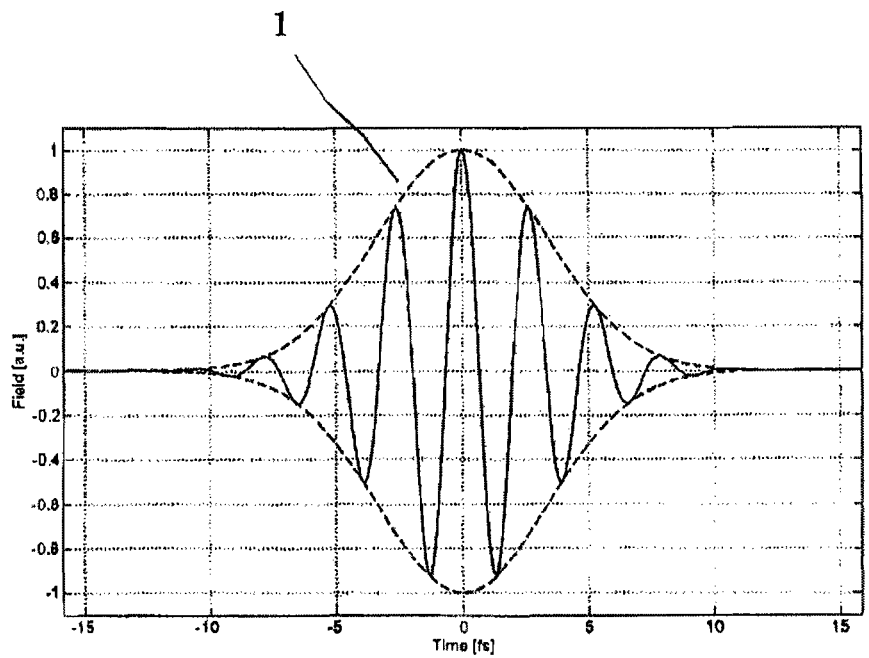
FIG. 1 depicts a schematically illustrated laser pulse.
Figure 2:
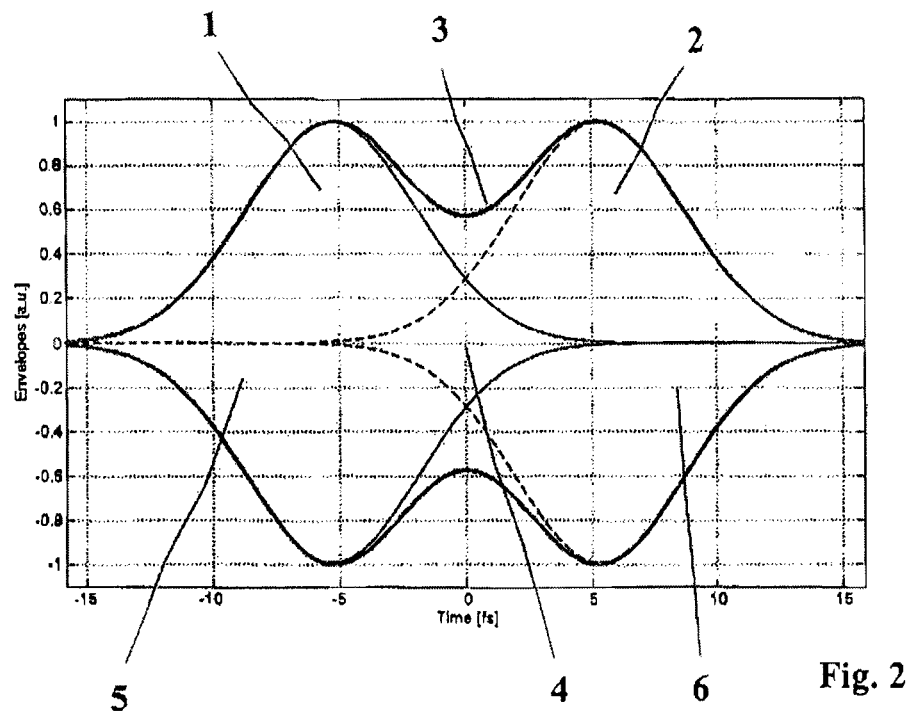
FIG. 2 depicts a schematically illustrated laser pulse with an overlapping, time-delayed copy thereof.

FIG. 1 schematically illustrates the intensity course of a known laser pulse 1. In FIG. 2, a second laser pulse 2, which is time-delayed relative to the first laser pulse 1, is indicated in broken lines as a copy of the first laser pulse 1 behind the latter, the two laser pulses 1, 2 partially overlapping each other. An overlapped laser pulse 3 is formed.

This overlapped laser pulse 3 is linearly polarized in its central pulse area 4 and elliptically polarized in its two outer pulse areas 5, 6.

Figure 3:
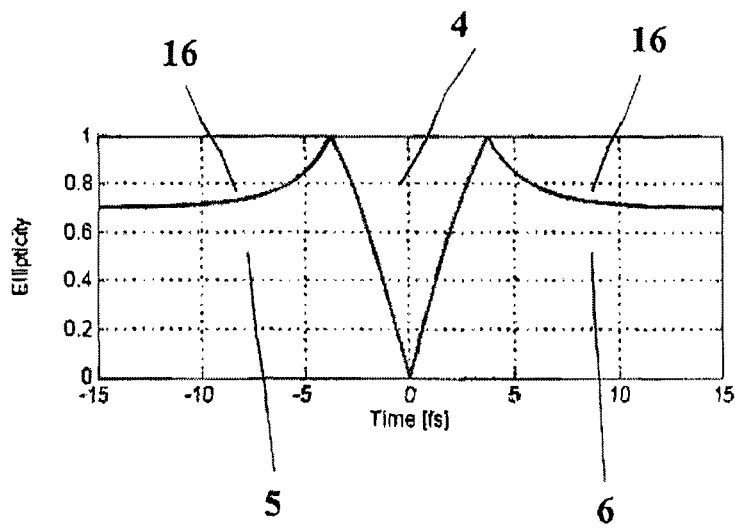
FIG. 3 depicts the polarization of the laser pulse.

FIG. 3 shows the course 16 of the elliptical polarization in the two outer pulse areas 5, 6. In the area 4, the polarization is linear only for about two optical cycles.

Figure 4:
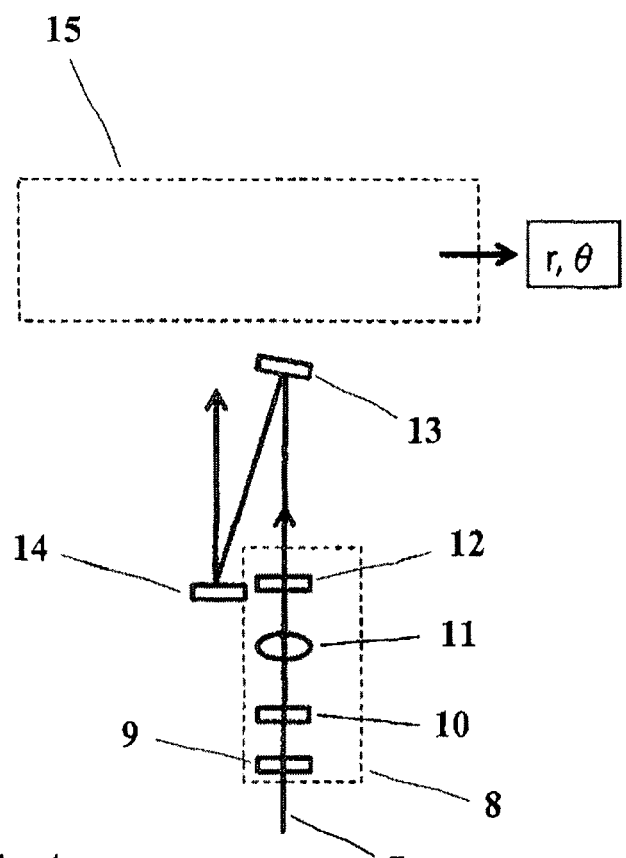
FIG. 4 depicts a scheme of a possible arrangement for the fast phase evaluation of ultrashort laser pulses. The laser pulses are changed in polarization direction in a time-dependent manner by a polarization gating stage prior to their interaction with a gas.

FIG. 4 illustrates an optional embodiment of the invention as an arrangement for the fast phase evaluation of ultrashort laser pulses. For the time-dependent change of its polarization, a laser pulse train 7 at first hits a polarization gating stage 8 comprising an aperture 9, a full-wave plate 10 of quartz glass, one or several Brewster windows 11 and a final, zero-order quarter-wave plate 12.

Within the polarization gating stage 8, the laser pulse train 7 at first passes the circular aperture 9 of variable diameter, for manual regulation of the pulse energy. The intensity curve of an individual laser pulse is illustrated in FIG. 1 (cf. laser pulse 1).

In the optical path of the laser pulse train 7, the full-wave plate 10 of quartz glass is disposed behind the aperture 9, which full-wave plate is oriented at an angle α=45° relative to the linear input polarization and generates pulse copies of the same amplitude, which are each perpendicular to each other (cf. laser pulses 1, 2 in FIG. 2), yet have pulse centers that are mutually delayed. The produced delay depends on the thickness 1 of the full-wave plate 10, which is selected such that the produced delay corresponds to an integer multiple of the cycle duration at the central wavelength $T_0$, of the ultrashort laser pulse 1. With a thickness of about $l_0$=88.6 μm (at a central wavelength of 800 nm), a delay of exactly one cycle duration will be achieved. From this, the thickness of the full-wave plate 10 for higher orders of the delay <l=n $l_0$> can be calculated via < >, n denoting the order of the full-wave plate 10. The resulting delay between the pulse centers of the laser pulses 1, 2 results from δ=n $T_0$. Other angles α will change the ratio between the amplitudes of the pulse copies and their polarization directions relative to the axes of the lab coordinate system x and y. Thus, α can be used to optimize the polarization direction onto the axis of the device proposed in DE 10 2010 019 814.5.

After this, the mutually delayed pulse copies pass the ultrathin Brewster window(s) 11, which reflect a portion of the horizontal field components as a function of their orientation relative to the vertical axis of the lab coordinate system, indicated by the angle γ, and hence change the ratio between the horizontal and vertical field components. This causes a change of the ellipticity in the pulse areas 5, 6 of the overlapped laser pulse 3 outside the overlap area of the laser pulses 1, 2.

The optical axis of the zero-order quarter-wave plate 12 consecutively arranged in the optical path of the laser pulse train 7 encloses an angle β=0° with the horizontal axis of the lab coordinate system. This generates a delay of $T_0$/4 between the horizontal field components relative to the vertical field components, and hence produces a linear polarization in the overlap area (cf. pulse area 4 in FIG. 2 and FIG. 3). Outside the overlap area, the pulse copies are elliptically polarized (cf. pulse areas 5, 6 in FIG. 2 and FIG. 3).

After having passed the polarization gating stage 8, the then produced, overlapped laser pulses 3 of the laser pulse train 7 are reflected by a plane mirror 13 and directed by a focussing mirror 14 to a phase evaluation stage 15 for measuring the phase position of the changed laser pulses of the laser pulse train 7.

The phase evaluation stage 15, which is preferably realized by the arrangement proposed in DE 10 2010 019 814.5, outputs angle parameters φ and a radius parameter R (cf. FIG. 4). In particular, an English translation of portions of DE 10 2010 019 814 A1, which published DE 10 2010 019 814.5, provides, with regard to an arrangement realizing the phase evaluation stage 15, that, FIG. 3 illustrates a block diagram of the apparatus according to the invention for the rapid phase evaluation of the individual cycle pulses of the laser beam 1 (cf. FIG. 2) as a purely analog variant. The photoelectrons 5, 6 released on both sides in the gas in the gas channel 2 are recorded in the stereo time-of-flight spectrometer according to FIG. 2 as time-of-flight spectra (left-hand and right-hand time-of-flight signals) using the detectors 8, 9. Each of these time-of-flight signals is respectively passed to two current integrators 10, 11 and 12, 13. For this purpose, the detector 8 is connected, on the output side, to the inputs of both the current integrator 10 with an output signal $L_S$ and the current integrator 11 with an output signal $L_1$. The detector 9 is suitably coupled to the current integrator 12 (output signal $R_S$) and to the current integrator 13 (output signal $R_1$).

A photodiode 14 which is set up at the output of the stereo time-of-flight spectrometer is respectively connected in pairs via two of the current integrators 10, 11, 12, 13 in pairs via two time-delayed trigger stages 15, 16 by virtue of the output of the trigger stage 15 respectively being connected to a control input (gate) of the current integrators 10, 12 and the output of the trigger stage 16 respectively being connected to a control input of the current integrators 11, 13. This gate control of the current integrators 10, 11, 12, 13 starts and ends the current integration intervals (slow and fast time of flight) for the photoelectrons of the stereo time-of-flight spectrometer (cf. FIG. 2) which are detected using the detectors 8, 9. The outputs of the current integrators 10, 11, 12, 13 are coupled to an analog evaluation unit 17. The latter contains two evaluation stages 18, 19 with the output signals x and y, respectively, for calculating the asymmetry of the individual cycle pulses of the laser radiation 1 which are to be evaluated (cf. FIG. 1 and FIG. 2) and an evaluation stage 20 which carries out a coordinate transformation and therefore outputs the absolute phase φ and the radius R.

The output of the current integrators 10 and 12 is respectively connected to an input of the evaluation stage 18 for calculating the asymmetry parameters for a fast time of flight (output signal x). The calculation in the evaluation stage 18 follows the general formula $(L_S-R_S)/(L_S+R_S)$. The output of the current integrators 11 and 13 is respectively connected to an input of the evaluation stage 19 for calculating the asymmetry parameters for a slow time of flight (output signal y). The calculation in the evaluation stage 19 follows the general formula $(L_1-R_1)/(L_1+R_1)$. Said asymmetry parameters for a fast and a slow time of flight are output as analog output signals x and y in cartesian coordinates. In the optional evaluation stage 20, the cartesian coordinates x and y are additionally converted into radial coordinates with the radius R (is a measure of the asymmetry) and the angle φ (corresponds to the absolute phase) which are likewise output as an analog signal.

FIG. 3 shows four individual current integrators 10, 12, 11, 13 (connected downstream of the detectors 8, 9). In contrast, it would also be possible (not illustrated in the drawing for reasons of clarity) for the individual current integrators 10, 11, 12, 13 to be implemented, for example, by means of a single integrator unit, this integrator stage respectively carrying out at least two integration functions (different time-of-flight ranges) which are triggered with a time delay for each detector channel. In this case, all integration functions for evaluating the detected photoelectrons of the stereo time-of-flight spectrometer would be combined in only one integrator unit, by way of example, as a component.

In contrast to FIG. 3, FIG. 4 shows an analog/digital block diagram of the apparatus according to the invention for the rapid phase evaluation of said individual cycle pulses.

As illustrated in FIG. 3, the output signals $L_S$, $L_1$, $R_S$, $R_1$ are generated in an analog manner from the time-of-flight signals from the detectors 8, 9 with the aid of the current integrators 10, 11, 12, 13 controlled, in terms of the time of flight, via the photodiode 14 and the trigger stages 14, 15, but pass to a digital evaluation unit 22 via an A/D converter 21. This evaluation unit contains digital evaluation stages 23, 24, 25, the functions of which each correspond, in terms of the principle, to the corresponding calculation functions of the analog evaluation stages 18, 19, 20 described with respect to FIG. 3, with the difference of the digital calculation.

The digital evaluation stages 23, 24, 25 are preferably implemented by means of a processor (not explicitly illustrated) which calculates said asymmetries and provides them in radial and cartesian coordinates. In this case, it is possible to output the calculated values in the form of signal amplitudes and/or to convert the values into times so that they can be output in the form of delayed pulses.

The outputs of the digital evaluation unit 21 with said functional digital evaluation stages 23, 24, 25 are connected to a D/A converter 26 which is in turn used to output the output signals x, y, R, φ described with respect to FIG. 3 in an analog manner.

FIG. 5 shows a block diagram of the apparatus according to the invention for the rapid and purely digital phase evaluation of the individual cycle pulses.

The time-of-flight signals (time-of-flight spectra) from the detectors 8, 9 and the signal from the photodiode 14 are digitized by an A/D converter 27 in this exemplary embodiment and are supplied to a digital evaluation unit 28. This digital evaluation unit 28 contains, as functional groups, two integrator stages 29, 30 for the digitized time-of-flight signals from the detectors 8, 9, two evaluation stages 31, 32 for said asymmetrical calculation according to the function $(L_S-R_S)/(L_S+R_S)$ and according to the function $(L_1-R_1)/(L_1+R_1)$ which correspond, in terms of the calculation function, to the evaluation stages 18, 19 from FIGS. 3 and 23, 24 from FIG. 4 as well as two digital evaluation stages 33, 34 for digitally calculating data both in cartesian and in radial coordinates, the signals from which are digitally output via an output stage 35," (English translation of paragraphs [0030]-[0039] of DE 10 2010 019 814 A1).

The interaction of the overlapped laser pulse 3, which thus comprises a time-dependent polarization direction, with a gas during the ionization differs from the interaction of laser pulses with time-independent polarization direction. High-kinetic energy electrons are efficiently produced only with sufficiently constant polarization directions. At the same time, the production rate of these high energetic electrons has the highest CEP dependency. Consequently, these particularly CEP-sensitive electrons are exclusively produced during the time period of near-constant polarization directions, i.e. in the center of the overlap area of the two pulse copies.

Hence a situation results that exhibits a similar CEP sensitivity as a single-cycle pulse. Correspondingly, the photoelectron distributions produced by laser pulses with time-dependent polarization directions have asymmetries that can be compared to those generated by single-cycle pulses. The radius parameter R, which is output by the already proposed device according to DE 10 2010 019 814.5 would thus be increased.

Due to this increase of the radius parameter R at a near-constant scatter Δr, the accuracy of the device is increased. The usable application range is thus expanded to laser pulses of a duration up to about 12 fs (at 800 nm central wavelength).

Alternatively to the polarization gating stage 8 illustrated in FIG. 3, the function of the same could also be realized by an interferometric set-up (not illustrated in the drawing) (e.g., P. Tzallas, E. Skantzakis, C. Kalpouzous, E. P. Benis, G. D. Tsakiris, D. Charalambidis: Generation of intense continuum extreme-ultraviolet radiation by many-cycle laser fields, Nature Physics, Vol. 3, 2007), or also by a set-up (not illustrated in the drawing, either) that uses the beat of mutually perpendicular, linearly polarized laser pulses with slightly different mean frequencies (e.g. P. B. Corkum, N. H. Burnett, M. Y. Ivanov: Subfemtosecond pulses, Optics Letters, Vol. 19, No. 22, 1994).

LIST OF REFERENCE NUMERALS USED

1—laser pulse
2—laser pulse (timely offset copy of laser pulse 1)
3—overlapped laser pulse
4—central pulse area (of the overlapped laser pulse 3)
5,6—outer pulse areas (of the overlapped laser pulse 3)
7—laser pulse train
8—polarization gating stage
9—aperture
10—full-wave plate
11—Brewster window
12—zero-order quarter-wave plate
13—plane mirror
14—focussing mirror
15—phase evaluation stage
16—curve of the elliptical polarization in the outer pulse areas 5,6
r—radius parameter output by phase evaluation stage 15
θ—angle parameter output by phase evaluation stage 15

What is claimed is:

1. A device for the fast phase evaluation of multi-cycle pulses of laser radiation comprising:
   a polarization gating stage arranged to generate changed laser pulses with time-dependently changing polarization directions, and
   a phase evaluation stage connected to the polarization gating stage and arranged to measure the phase position of the changed laser pulses, the phase evaluation stage comprising a gas, which is ionized by the changed laser pulses, and a stereo time-of-flight spectrometer.

2. The device according to claim 1, wherein the polarization gating stage comprises a double-refracting crystal and a further double-refracting crystal.

3. The device according to claim 1, wherein the polarization gating stage comprises a double-refracting crystal, a partially polarizing window, and a further double-refracting crystal.

4. The device according to claim 1, wherein the polarization gating stage comprises an interferometric set-up.

5. The device according to claim 1, wherein the polarization gating stage is arranged to use the beat of mutually perpendicular, linearly polarized laser pulses with slightly different mean frequencies to generate laser pulses with time-dependently changing polarization directions.

* * * * *